UNITED STATES PATENT OFFICE.

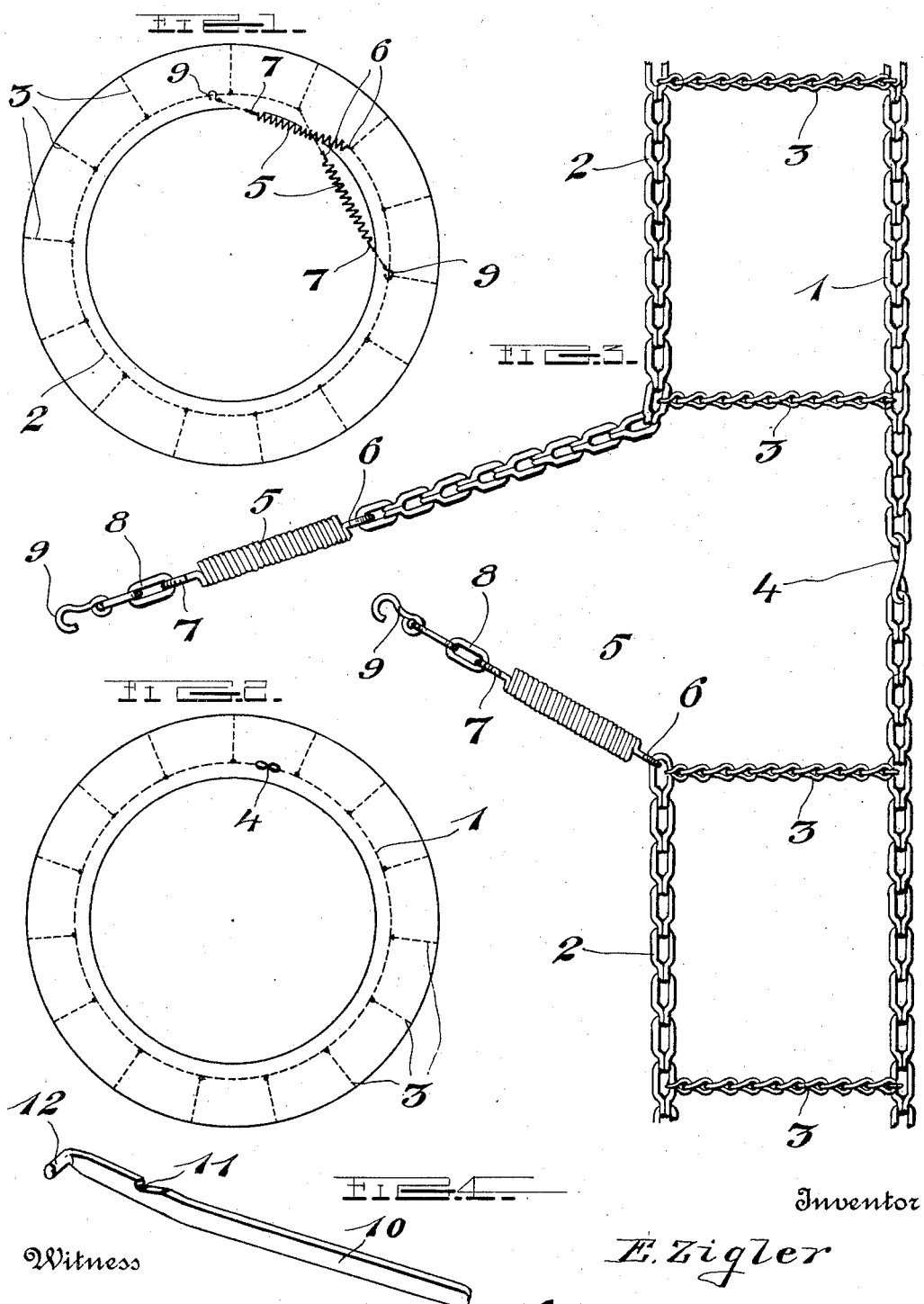

ELMER ZIGLER, OF FORT PIERRE, SOUTH DAKOTA.

TIRE-CHAIN RETAINER.

1,382,045.　　　　Specification of Letters Patent.　　Patented June 21, 1921.

Application filed October 2, 1919. Serial No. 327,905.

*To all whom it may concern:*

Be it known that I, ELMER ZIGLER, a citizen of the United States, residing at Fort Pierre, in the county of Stanley and State of South Dakota, have invented certain new and useful Improvements in Tire-Chain Retainers; and I do declare the following to be a full, clear, and exact description of the invention, such as will enable others skilled in the art to which it appertains to make and use the same.

This invention relates to improvements in automobile tire chains and it has more particular reference to a retainer for the same.

The primary object of the invention is to provide a retainer which is simple and effective, one in which the construction is such that the chain will be caused to fit snugly on the tread of the tire, thereby preventing undue wear of the tire and the chain, and avoiding undesirable noise, incidental to loose chains.

Another object of the invention is to provide a tire retainer which is simple in construction, strong, durable, inexpensive to manufacture, one which is easily applied and removed, and one which will not easily come off of the tire, thereby preventing loss of the chains which is common with the types of fasteners and retainers now in use.

Other objects and advantages of the invention will become apparent during the course of the following description.

In the accompanying drawings forming a part of this specification and in which like numerals are employed to designate like parts throughout the same, Figure 1 is a diagrammatic view illustrating one side of a tire and the relative positions of my retainers as applied thereto.

Fig. 2 is a view like Fig. 1 showing the reverse side of the tire and chain.

Fig. 3 is a top plan view of a device constructed in accordance with my invention.

Fig. 4 is a detail view of a special tool used in applying a tire chain equipped with my improved retainer.

In the drawings wherein for the purpose of illustration is shown a preferred embodiment of my invention, the numerals 1 and 2 designate a pair of side chains which are connected by the usual cross chains or tread chains 3. The side chain 1 is permanently connected by an approximately S-shape link 4 and thus forms a continuous chain for the one side of the tire, thus obviating the necessity of the employment of a retainer or other fastening means at this side of the tire. The other side chain 2 is provided with a gap as shown, and it is at this point of the circumference of this chain to which my improved retainer is attached.

The tire chain retainer is of a very simplified construction and comprises a pair of yieldable members which are preferably in the form of coiled springs 5 which are carried by, and secured to, the end links of the chain 2. Each of the coiled springs is provided with hooks 6 and 7 at their opposite ends and the hook 6 is clenched about or around the end link of the chain 2. Hook 7 is clenched about a link 8.

There are preferably two or more of the links 8, although there need be only one, and the outer or last one carries the attaching means, which is in this instance a hook 9. When in position the springs 5 will cross one another and the hooks 9 engaged in the desired or proper link of the chain 2 as will hereinafter be more fully explained.

In putting on chains equipped with my improved retainers it will be found advantageous, and in some instances, necessary to employ a special tool, which I have shown in Fig. 4. The tool as shown, includes a handle 10 provided with a notch 11 adapted to receive one of the links 8 therein, and the end of the handle is bent as at 12 to form a fulcrum for the tool.

Having set forth the preferred construction of my retainer and special tool, I will now set forth clearly the best manner known to me of making use of the same. After the wheel has been jacked up it will be found best to place the continuous chain 1 in position first, which of course can be and is readily done by those experienced in this line. Now, by taking hold of the hook 9 and pulling it across the tire as illustrated in Fig. 1 it may be hooked in the link closest to which it reaches or the side chain 2. I insert the handle 10 through one of the links 8 in the now unhooked or unpositioned retainer and permit this link to seat itself in the notch 11. By crossing this retainer over the already hooked one and inserting the hook 12 of the handle 10 in a suitable link of the chain 2 in rear of link 8 and operating it as a lever, the entire chain may be drawn tight around the tire and the spring 5 placed under tension to permit the hook 9 to be inserted into the proper link in the chain to hold the chain snugly against the tread of the tire.

It is to be understood that the form of my invention herein shown and described is to be taken as a preferred embodiment of the same, and that various changes in the shape, size and arrangement of parts may be resorted to without departing from the spirit of the invention or the scope of the subjoined claim.

Having thus described my invention, what I claim is:

A tire chain retainer comprising a pair of coiled springs provided at the opposite ends with hooks, the hooks at one end being adapted for connection to the free ends of one of the side chains of a tire chain, a plurality of links secured to the hooks at the opposite ends of said springs to permit a special chain drawing tool to be passed through one of these links, and separate hooks attached to the end links, said last hooks being adapted to be connected with one of the links of the aforesaid side chain to retain the entire chain in position on the tire.

In testimony whereof I have hereunto set my hand.

ELMER ZIGLER.